(12) United States Patent
Long

(10) Patent No.: US 10,674,225 B2
(45) Date of Patent: Jun. 2, 2020

(54) CHECKING CAPACITY FOR A MULTIMEDIA SESSION

(71) Applicant: Telefonaktiebolaget LM Ericsson (publ), Stockholm (SE)

(72) Inventor: Hongxia Long, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/090,330

(22) PCT Filed: Jun. 8, 2016

(86) PCT No.: PCT/SE2016/050547
§ 371 (c)(1),
(2) Date: Oct. 1, 2018

(87) PCT Pub. No.: WO2017/180034
PCT Pub. Date: Oct. 19, 2017

(65) Prior Publication Data
US 2019/0116402 A1    Apr. 18, 2019

(30) Foreign Application Priority Data

Apr. 11, 2016   (WO) ............... PCT/CN2016/078943

(51) Int. Cl.
*H04N 21/647*   (2011.01)
*H04W 80/10*    (2009.01)
(Continued)

(52) U.S. Cl.
CPC ....... *H04N 21/64738* (2013.01); *H04L 29/06* (2013.01); *H04N 21/6405* (2013.01);
(Continued)

(58) Field of Classification Search
CPC ........ H04N 21/64738; H04N 21/6405; H04W 4/06; H04W 80/10; H04W 76/10
See application file for complete search history.

(56) References Cited

U.S. PATENT DOCUMENTS

2012/0170501 A1   7/2012   Drozt et al.
2013/0104173 A1*  4/2013   Tjio .................. H04N 21/2187
                                                              725/62

FOREIGN PATENT DOCUMENTS

WO       2013039709 A1    3/2013
WO    WO-2013039709 A1 *  3/2013  ............ H04W 76/40

* cited by examiner

*Primary Examiner* — Yassin Alata
(74) *Attorney, Agent, or Firm* — Sage Patent Group

(57) ABSTRACT

It is presented a method for checking capacity for a multimedia session. The method comprises the steps of: receiving a capacity request for a multimedia session, the capacity request comprising a desired bandwidth, a requested Quality of Service Class Identifier, QCI, a requested time window and a desired location in terms of at least one service area, each service area being served by a plurality of radio base stations; checking whether there is sufficient capacity in each service area for the desired bandwidth and desired QCI during the desired time window of the request by reading available 0 capacity in an aggregated capacity database, the aggregated capacity database comprising available bandwidth capacity on a service area level and by reading available radio capacity on a radio resource level in a resource capacity database; and sending a response based on whether there is sufficient capacity or not.

17 Claims, 4 Drawing Sheets

(51) Int. Cl.
    *H04L 29/06*           (2006.01)
    *H04W 28/20*         (2009.01)
    *H04W 4/06*           (2009.01)
    *H04N 21/6405*     (2011.01)
    *H04W 28/24*         (2009.01)
    *H04W 76/10*         (2018.01)

(52) U.S. Cl.
    CPC ............. *H04W 4/06* (2013.01); *H04W 28/20* (2013.01); *H04W 80/10* (2013.01); *H04W 28/24* (2013.01); *H04W 76/10* (2018.02)

CHECKING CAPACITY FOR A MULTIMEDIA SESSION

TECHNICAL FIELD

The invention relates to a method, multimedia delivery service nodes, a computer program and a computer program product for checking capacity for a multimedia session.

BACKGROUND

Cellular communication systems have become commonplace and are used by a large majority of people for person-to-person communication. Moreover, with the increasing use of smartphones, digitally distributed content is more and more consumed on wireless terminals. While the delivery of a large part of such content, e.g. web content, needs to be directly controllable by the user, the delivery of media content, such as video, can in many cases be shared by several users.

In order to increase efficiency of shared media consumption, point-to-multipoint systems such as broadcasting and/or multicasting can be used. In this way, network resources are shared between receiving wireless terminals to a higher degree. A set of related standards for point-to-multipoint content delivery using cellular communication systems is 3GPP MBMS (3rd Generation Partnership Project—Multimedia Broadcast Multicast Service) and 3GPP eMBMS (evolved MBMS).

However, the scheduling and planning of eMBMS sessions becomes very complex. A cellular communication system can have thousands of radio base stations, whereby capacity checking based on checking each radio base station is very time consuming, and can amount to more than fifteen minutes for one multimedia session at the time of filing this patent application. Moreover, the service operation department and the RAN (Radio Access Network) operation department belong to different organisational units, whereby information is not easily shared on a detailed level. When multivendor deployments are used, the problem of capacity checking is only aggravated.

SUMMARY

It is an object to make checking of capacity for multimedia sessions more efficient.

According to a first aspect, it is presented a method for checking capacity for a multimedia session. The method is performed in a multimedia delivery service node of a multimedia network, and comprises the steps of: receiving a capacity request for a multimedia session, the capacity request comprising a desired bandwidth, a requested Quality of Service Class Identifier, QCI, a requested time window and a desired location in terms of at least one service area, each service area being served by a plurality of radio base stations; checking whether there is sufficient capacity in each service area for the desired bandwidth and desired QCI during the desired time window of the request by reading available capacity in an aggregated capacity database, the aggregated capacity database comprising available bandwidth capacity on a service area level and by reading available radio capacity on a radio resource level in a resource capacity database; and sending a response based on whether there is sufficient capacity or not.

The capacity request may further comprise a list of cell identifiers which are a subset of all cell identifiers sets of the at least one service area, the list of cell identifiers providing more detail with regard to the desired location.

The response may further comprise an indication of available capacity to fulfil the capacity request.

The method may further comprise the step of: reserving capacity by updating the aggregated capacity database when there is sufficient capacity.

The step of reserving capacity may further comprises reserving capacity for the multimedia session of the capacity request without multiplexing the multimedia session with other multimedia sessions when the capacity request comprises an indicator not to multiplex.

The step of reserving capacity may comprise updating the resource database to reflect a new available bandwidth and radio resource usage as a result of the capacity request.

In the step of receiving a capacity request, the capacity request may be in the form of a multimedia session setup request.

The method may further comprise the step of: proceeding with a multimedia session setup only when there is sufficient capacity.

The resource capacity database may store available radio capacity per combination of service area list and QCI list.

The resource capacity database may store available radio capacity per combination of cell id and QCI.

According to a second aspect, it is presented a multimedia delivery service node for checking capacity for a multimedia session. The multimedia delivery service node is configured to form part of a multimedia network and comprises: a processor; and a memory storing instructions that, when executed by the processor, cause the multimedia delivery service node to: receive a capacity request for a multimedia session, the capacity request comprising a desired bandwidth, a requested Quality of Service Class Identifier, QCI, a requested time window and a desired location in terms of at least one service area, each service area being served by a plurality of radio base stations; check whether there is sufficient capacity in each service area for the desired bandwidth and desired QCI during the desired time window of the request by reading available capacity in an aggregated capacity database, the aggregated capacity database comprising available bandwidth capacity on a service area level and by reading available radio capacity on a radio resource level in a resource capacity database; and send a response based on whether there is sufficient capacity or not.

The capacity request may further comprise a list of cell identifiers which are a subset of all cell identifiers sets of the at least one service area, the list of cell identifiers providing more detail with regard to the desired location.

The response may further comprise an indication of available capacity to fulfil the capacity request.

The multimedia delivery service node may further comprise instructions that, when executed by the processor, cause the multimedia delivery service node to reserve capacity by updating the aggregated capacity database when there is sufficient capacity.

The instructions to reserve capacity may further comprise instructions that, when executed by the processor, cause the multimedia delivery service node to reserve capacity for the multimedia session of the capacity request without multiplexing the multimedia session with other multimedia sessions when the capacity request comprises an indicator not to multiplex.

The instructions to reserve capacity may comprise instructions that, when executed by the processor, cause the multimedia delivery service node to updating the resource database to reflect a new available bandwidth and radio resource usage as a result of the capacity request.

The capacity request may be in the form of a multimedia session setup request.

The multimedia delivery service node may further comprise instructions that, when executed by the processor, cause the multimedia delivery service node to proceed with a multimedia session setup only when there is sufficient capacity.

The resource capacity database may store available radio capacity per combination of service area list and QCI list.

The resource capacity database may store available radio capacity per combination of cell id and QCI.

According to a third aspect, it is presented a multimedia delivery service node comprising: means for receiving a capacity request for a multimedia session, the capacity request comprising a desired bandwidth, a requested Quality of Service Class Identifier, QCI, a requested time window and a desired location in terms of at least one service area, each service area being served by a plurality of radio base stations; means for checking whether there is sufficient capacity in each service area for the desired bandwidth and desired QCI during the desired time window of the request by reading available capacity in an aggregated capacity database, the aggregated capacity database comprising available bandwidth capacity on a service area level and by reading available radio capacity on a radio resource level in a resource capacity database; and means for sending a response based on whether there is sufficient capacity or not.

According to a fourth aspect, it is presented a computer program for checking capacity for a multimedia session. The computer program comprises computer program code which, when run on a multimedia delivery service node of a multimedia network causes the multimedia delivery service node to: receive a capacity request for a multimedia session, the capacity request comprising a desired bandwidth, a requested Quality of Service Class Identifier, QCI, a requested time window and a desired location in terms of at least one service area, each service area being served by a plurality of radio base stations; check whether there is sufficient capacity in each service area for the desired bandwidth and desired QCI during the desired time window of the request by reading available capacity in an aggregated capacity database, the aggregated capacity database comprising available bandwidth capacity on a service area level and by reading available radio capacity on a radio resource level in a resource capacity database; and send a response based on whether there is sufficient capacity or not.

According to a fifth aspect, it is presented a computer program product comprising a computer program according to the fourth aspect and a computer readable means on which the computer program is stored.

Here now follows a set of definitions on how to construe certain terms used herein:

Service area is to be construed as an area for delivering a multimedia service. Implemented using a plurality of radio base stations.

Bandwidth is to be construed as capacity requirement in terms of data units per time unit, e.g. kilobits per second (KBPS).

Multimedia delivery service node is to be construed as node being responsible for the general flow of content from content providers to the wireless terminals, including providing both content and metadata at appropriate points in time.

Multimedia session is to be construed as a session for providing a multimedia content, e.g. in the form of audio and/or video.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Embodiments presented herein are based on the realisation that resource capacity for multimedia sessions can be represented by a set of data structures on different layers of abstractions. Specifically, an aggregated capacity database and a resource capacity database are provided for providing an efficient way of checking and reserving capacity for the multimedia sessions.

Figure 1:
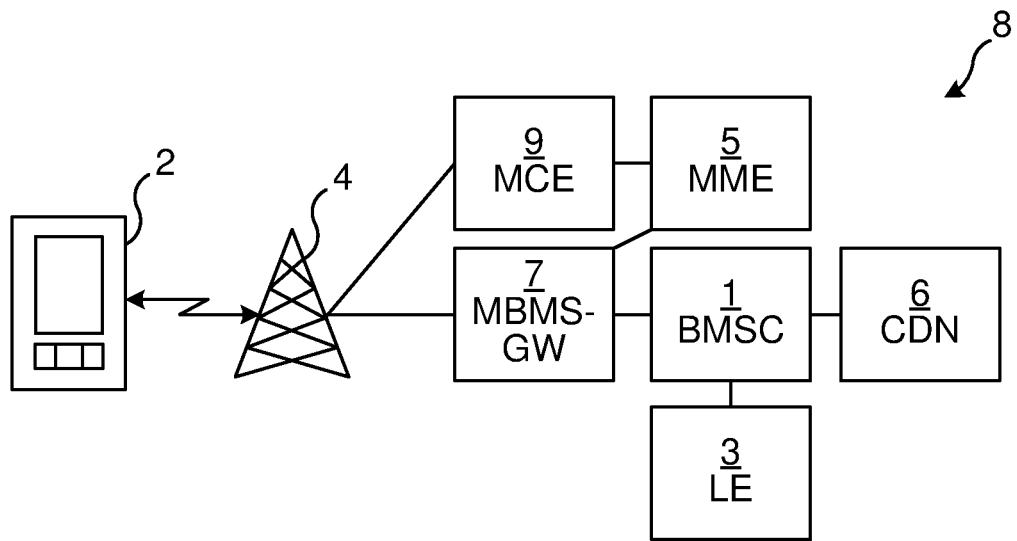
FIG. 1 is a schematic diagram illustrating a communication system where embodiments presented herein may be applied.

FIG. 1 is a schematic diagram illustrating a communication system 8 where embodiments presented herein may be applied. The communication system 8 comprises one or more radio base stations 4, here in the form of an evolved Node B, also known as eNode B or eNB. The radio base stations 4 could also be in the form of a Node B, BTS (Base Transceiver Station) and/or BSS (Base Station Subsystem), etc. The radio base stations 4 provide radio connectivity to a plurality of wireless terminals 2. The wireless terminals 2 shown here are capable of receiving a broadcast and/or a multicast content feed. The term wireless terminal is also known as mobile communication terminal, user equipment, mobile terminal, user terminal, user agent, machine-to-machine device etc., and can be, for example, what today are commonly known as a mobile phone or a tablet/laptop with wireless connectivity or fixed mounted terminal.

The communication system 8 may e.g. comply with any one or a combination of LTE-SAE (Long Term Evolution—System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

The communication system 8 further acts as a multimedia network and comprises components to support broadcast content, in a broadcast or a multicast way, i.e. multiple wireless terminals 2 can receive the same content in a point-to-multipoint fashion. This increases network efficiency, e.g. compared to point-to-point streaming, also known as unicast.

The components for broadcast can comply with any suitable standard, e.g. 3GPP MBMS (3rd Generation Partnership Project Multimedia Broadcast Multicast Service), 3GPP MBMS Evolution, 3GPP IMB (Integrated Mobile Broadcast), 3GPP eMBMS (Evolved MBMS), DVB-H (Digital Video Broadcasting-Handheld), DVB-NGH (Digital Video Broadcasting—Next Generation Handheld), or any other current or future broadcast system over wireless networks, as long as the principles described hereinafter are applicable. In this document, embodiments are presented as applied in 3GPP MBMS release 6 or later, but it is to be understood that this does not imply that any other standard is excluded.

A multimedia delivery service node 1, such as a Broadcast Multicast Service Center (BMSC) is also provided. Hereinafter, the term BMSC will be used, but it is to be understood that the embodiments presented can equally well be employed with other embodiments of multimedia delivery service nodes. The multimedia delivery service node 1 is responsible for the general flow of content from content providers to the wireless terminals 2, including providing both content and metadata at appropriate points in time.

One or more content providers, providing content through a content delivery network (CDN) 6 are also connected to the BMSC 1. In this way, the wireless terminals 2 can receive broadcast content from the content delivery network 6. The content which is provided from the content delivery network 6 can e.g. comprise video content and/or audio content.

An MBMS-GW 7 connects to the MME 5 in a control plane and in a data plane to the BMSC 1 with the radio access network and radio base stations 4. Moreover, the MBMS-GW 7 is responsible for session management, etc.

An MCE (Multi-cell/multicast Coordination Entity) 9 is provided and has responsibilities such as admission control and allocation of radio resources used by the radio base stations e.g. for SFN (Single Frequency Network). The MCE 9 can be implemented in a stand-alone device as shown in FIG. 1 or as part of the radio base stations 4.

A live encoder 3, also known as a segmentor or live encoder/segmentor, can be provided to be responsible for encoding live content from a live camera or the content delivery network 6 in an appropriate format, and segmenting the encoded content in smaller segment files. The segment files can e.g. include video and/or audio data. These segment files are then later provided via the MBMS-GW 7 to the wireless terminals 2. The wireless terminals 2 have a buffer to store and decode the segment files to provide continuous content presentation to the user of the wireless terminals 2.

An MME (Mobility Management Entity) 5 is provided with a connection to the radio base stations 4. The MME is a node which processes the signalling between the wireless terminals 2 and the Core Network (CN) and provides Visitor Location Register (VLR), supports functions related to bearer and connection management.

In order not to obscure the concepts presented herein, other (sometimes optional) network nodes such as Radio Network Controller, GGSN (Gateway GPRS (general packet radio service) support node), SGSN (serving GPRS support node), are omitted from the communication system 8 of FIG. 1, but may be used as needed during operation. Other components not required to present the embodiments presented herein are omitted for reasons of clarity.

Figure 2:
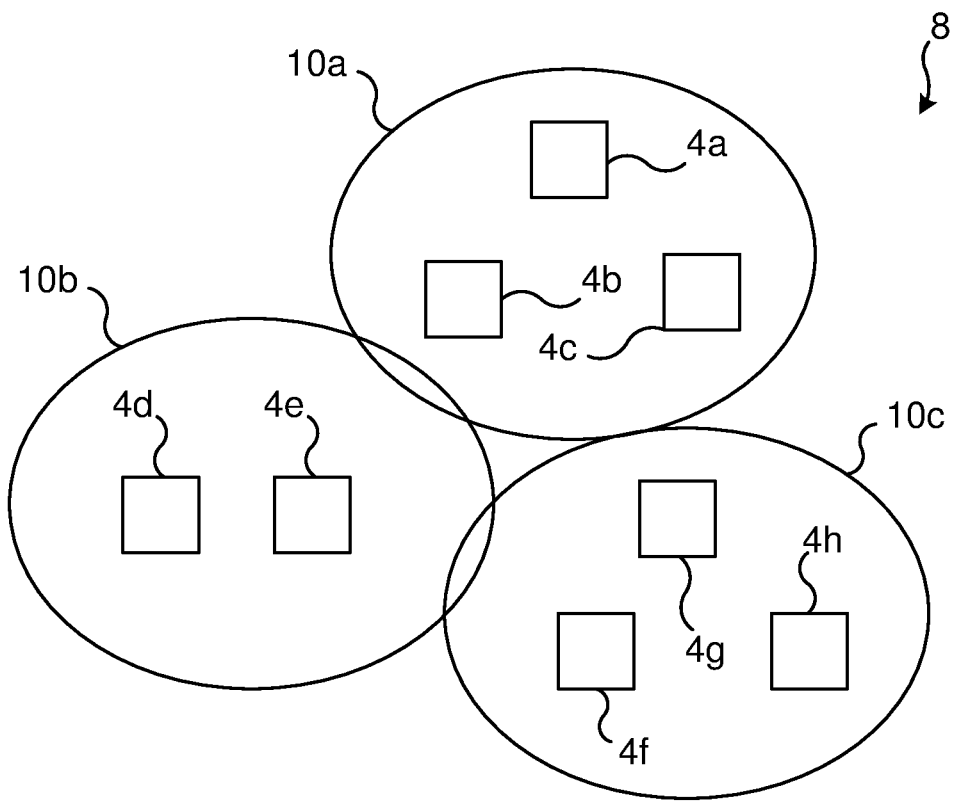
FIG. 2 is a schematic diagram illustrating use of single frequency networks, which can be applied in the system of FIG. 1.

FIG. 2 is a schematic diagram illustrating use of single frequency networks, which can be applied in the system of FIG. 1. The point to multipoint delivery (e.g. broadcast or multicast) of content is an efficient way to deliver same content to large number of wireless terminals in terms of frequency spectrum usage. In the radio network interfaces between the radio network node 4 and the wireless terminals 2, this can be based on single frequency network (SFN) technology, e.g. MBSFN (Multimedia Broadcast SFN). This means that once the multiple signals from multiple cells are tightly synchronised, the multiple signals received on the same frequency from multiple cells appear at the wireless terminal as multi-paths of same signal transmission. In this way, the multiple signals do not interfere with each other but contribute to a useful signal which could be combined to enhance received signal strength.

In FIG. 2, there is a first SFN boa served by a first radio network node 4*a*, a second radio network node 4*b* and a third radio network node 4*c*. A second SFN 10*b* is served by a fourth radio network node 4*d* and a fifth radio network node 4*e*. A third SFN 10*c* is served by a sixth radio network node 4*f*, a seventh radio network node 4*g* and an eighth radio network node 4*h*.

Figure 3:
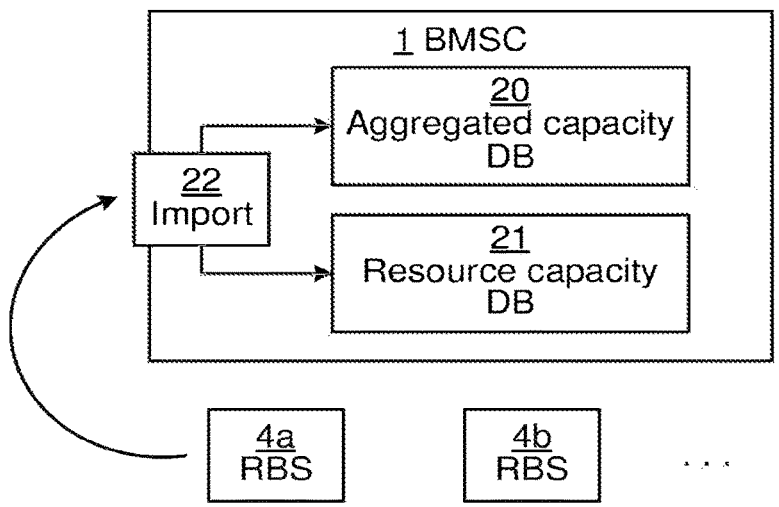
FIG. 3 is a schematic diagram illustrating a data structure for resource usage used in the system of FIG. 1.

FIG. 3 is a schematic diagram illustrating a data structure for resource usage used in the system of FIG. 1. There are here two databases—an aggregated capacity database 20 and a resource capacity database 21. Each database can be any suitable data storage suitable for storing data as described herein. For instance each one of the databases 20, 21 can be a table or other data structure of an encompassing database. In FIG. 3, higher resources are more aggregated and lower resources are more detailed. In other words, the granularity is increased from top to bottom.

The aggregated capacity database 20 represents a service capacity layer. This is a bandwidth oriented layer and holds the maximum available bandwidth for each service area (e.g. referred to using a service area identity, SAI) and each allowed QCI on the service area if all corresponding resources are occupied. The bandwidth used is mapped to a used ratio of resources in the resource capacity database. This is done since resources are dynamically shared by different services for the same or different QCI (Quality of Service Class Identifier) indices. QCI is parameter of a QoS (Quality of Service) profile of a bearer. The QCI controls how prioritised the bearer should be by the network, e.g. in terms of scheduling weights, admission thresholds, queue management thresholds, link layer protocol configuration, etc. Hence, a bearer with web browsing traffic can have a QCI with a lower priority than a telephone call.

Table 1 illustrates an example of how the aggregated capacity database 20 can be implemented and populated:

TABLE 1

Example of aggregated capacity database 20

| SAI | QCI | Available Bandwidth |
|---|---|---|
| 1 | 12 | 3,408 |
| 1 | 13 | 4,579 |
| 2 | 12 | 3,408 |
| 2 | 13 | 4,579 |

In Table 1, time is omitted for reasons of clarity. The resource capacity database 21 represents a resource layer, holding the resource usage percentage for different resources. In the resource view, the hard limitation is on the resource, since the same radio resource could provide different bitrate based on radio characteristics dimensioned (e.g. using different MCS (Modulation and Coding Schemes) etc.). Resource is here to be construed as a resource pipe representing a set of radio resources, e.g. in terms of subframe allocation. At resource capacity view, the usage is based on percentage. Table 2 illustrates one example of the resource capacity database 21 can be implemented and populated for one resource (in this example, the identity is 2):

TABLE 2

Example of resource capacity database 21

| Resource | SAI List | QCI List | Used Ratio |
|---|---|---|---|
| 2 | 1, 2 | 12, 13 | 0% |

In Table 2, time is omitted for reasons of clarity. Resource can e.g. be MBSFN subframes. The SAI list is a set of one or more SAIs and the QCI list is a set of one or more QCIs. The Used Ratio is the used percentage of the resource pipe, 0% means the resource is not used yet, 100% means the resource is fully utilized. In an alternative embodiment, available ratio is used instead of used ratio.

The SAIs can be organised in a tree structure in order to cover a large area, e.g. a whole country. For instance a country is covered by a national SAI. The country is made up by regional SAIs, each of which is made up by local SAIs. Each local SAI is made up by one or more radio base stations. MBSFNs are designed in a flat way, and normally have a one to one mapping with the lowest level of SAI, and MBSFN ID (256 values) is not a unique ID across an entire PLMN (Public Land Mobile Network). It would be time consuming to generate the SAI tree structure from all the radio base stations (can be in the tens of thousands) and importing them from the RAN (Radio Area Network) configuration design tool can be unreliable. Furthermore, only modelling MBSFNs with a unique number within the PLMN does not address the need of modelling different geography level services (national, regional, local) and different type of services (video, data, MCPTT (mission critical push to talk)) mapping to thousands of MBSFNs.

By using the aggregated capacity database 20 and the resource capacity database 21, the combination of SAI list and QCI list is used as the key to uniquely identify resources.

When there is an SAI tree structure, this could be imported into the BMSC and its data structure. In this way, the relationship of SAIs is known all the way to the lowest level SAI, also known as atom SAI, i.e. not having any children SAIs. For instance, an XML structure such as the following example can be used:

```
<SAI id="10001">
    <SAI id="5001">
        <SAI id="1"/>
        <SAI id="60" />
    </SAI>
    <SAI id="5010">
        <SAI id="541" />
        <SAI id="600" />
    </SAI>
</SAI>
```

Using this structure and the method described in more detail below, the BMSC and RAN is ensured to hold synchronised MBSFN capacity information for different locations (SAIs).

Now, the relationship between the aggregated capacity database 20 and the resource capacity database 21 will be described in some more detail.

Based on a mapping rule, the aggregated resources in the service capacity layer (in the aggregated capacity database 20) are translated into resource capacity layer. Referring to the example of Tables 1 and 2, SAI:1+QCI:12, SAI:1+QCI:13, SAI:2+QCI:12 and SAI:2+QCI:13 are all mapped to same resource identified as resource 2.

The service and resource capacity view is across radio base stations or even across MBSFNs. Based on this radio base station transparent model, the service capacity layer is released from the heavy work to check each radio base station on resource availability. The RAN layer only exposes necessary info to the service capacity layer, which could be manually imported 66 into the service capacity layer (i.e. in the aggregated capacity database 20) as the volume is reduced. Database similar operation commands can be used for this such as for update, delete etc.

By importing RAN MBSFN capacity and location attribute (SAIs) into the databases 20, 21 in the BMSC 1, this information can be used for service planning and delivery optimisation. To have a centralised and global MBSFN resource view, optimised resource allocation and usage is made possible, instead of sub-optimised check or even blind check. When resources are insufficient, the problem and resource gap can be visualised, whereby the operator could be provided with complete information to control service competition based on service priority or service specific policy or even decide to expand their network at specific locations to accommodate more demanding services. Moreover, resource control is moved one step earlier to the source node at service capacity layer rather than in radio base stations, which dramatically reduces requirements on the radio base stations.

With this new model, the service capacity layer is not dependent on the radio layer to provide the detailed capacity information on MBSFN per radio base station, whereby the service capacity layer is decoupled from per-radio base station based data. The service capacity layer is provided with an ability to keep a simple global review for whole broadcast resource status for the network. This can be easily incorporated into SDN (Software Defined Network) based architecture for software defined LTE broadcast transport resource controller. Moreover, this abstracted resource model is generic and could be employed in a multivendor network.

Figure 4:
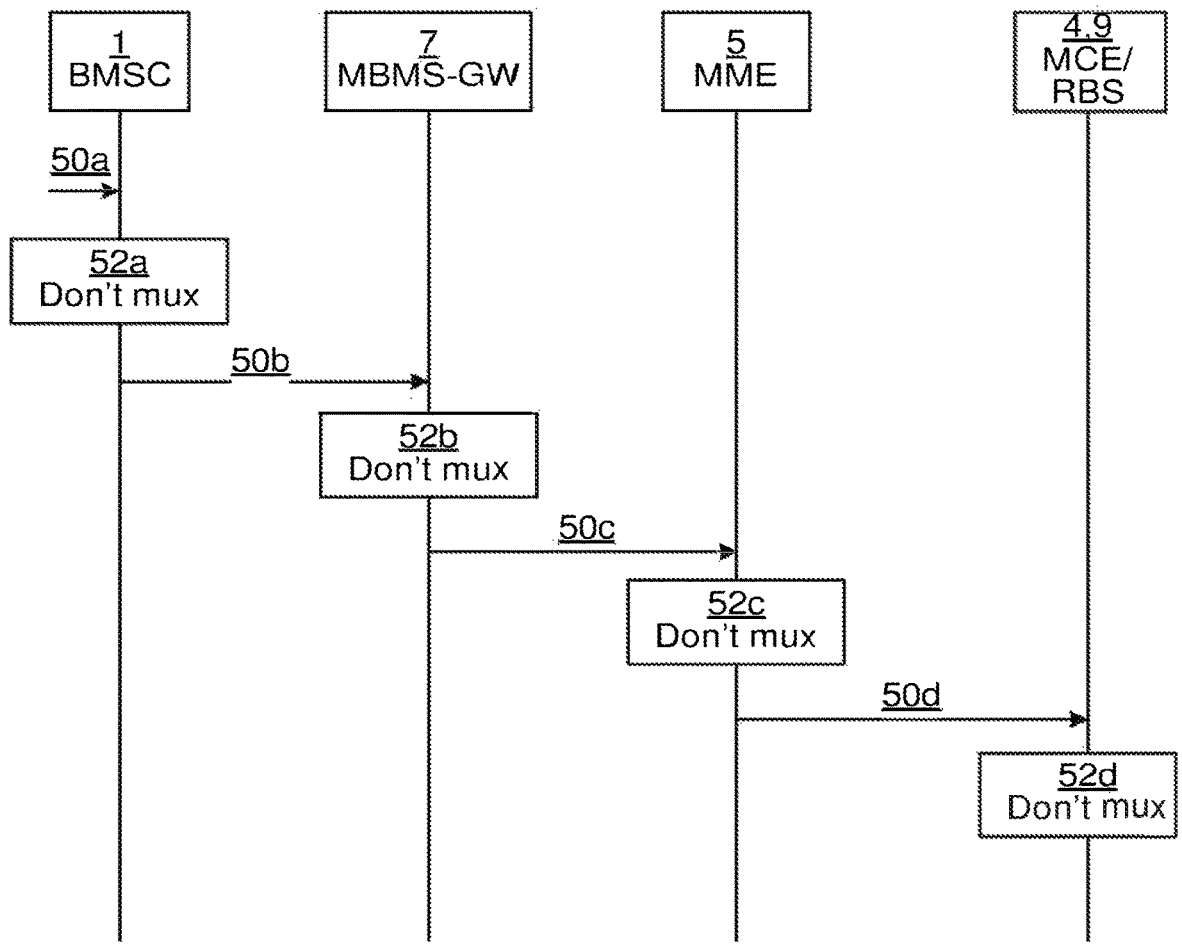
FIG. 4 is a sequence diagram illustrating how to avoid multiplexing multimedia sessions in the system of FIG. 1.

FIG. 4 is a sequence diagram illustrating how to avoid multiplexing multimedia sessions in the system of FIG. 1. This sequence can be applied in combination with the methods described below. This sequence can be applied at any time before the multimedia session is stopped.

The BMSC 1 receives a first eMBMS session setup request 50*a* with an explicit reservation to not multiplex with other sessions. This can e.g. be due to the eMBMS being a mission critical session whose delivery reliability should not be compromised. The BMSC 1 then ensures 52*a* the setup will not multiplex with other eMBMS sessions and sends a second eMBMS session setup request 50*b* (with an explicit reservation to not multiplex with other sessions) to the next node in the chain, the MBMS-GW 7.

The MBMS-GW 7 receives a second eMBMS session setup request 50*b* with an explicit reservation to not multiplex with other sessions. The MBMS-GW 7 then ensures 52*b* the setup will not multiplex with other eMBMS sessions and sends a third eMBMS session setup request 50*c* (with an explicit reservation to not multiplex with other sessions) to the next node in the chain, MME 5.

The MME 5 receives a third eMBMS session setup request 50*c* with an explicit reservation to not multiplex with other sessions. The MME 5 then ensures 52*c* the setup will not multiplex with other eMBMS sessions and sends a fourth eMBMS session setup request 50*d* (with an explicit reservation to not multiplex with other sessions) to the next and final node in the chain, the MCE. As explained above, the MCE can be implemented as a standalone MCE 9 (as in FIG. 1) or as part of the radio base station 4.

The MCE 9/radio base station 4 receives a fourth eMBMS session setup request 50*d* with an explicit reservation to not multiplex with other sessions. The MCE 9/radio base station 4 then ensures 52*c* the setup will not multiplex with other eMBMS sessions and can send a response (not shown) to the MME 5.

It is thus shown an end to end explicit reservation procedure for broadcast resource reservation from the BMSC 1 as the source node to the radio base station 4 as the destination node. The sequence is performed to setup a virtual link, where each node in the path receiving the eMBMS session setup request reads the explicit reservation indicator, and acts accordingly.

When the explicit reservation indicator is present, then the node shall not multiplex this broadcast session with other services from resource reservation point of view even if the actual traffic is lower than requested (steps 52*a*-*d* of FIG. 4)

When the explicit reservation indicator is not present, which is a normal scenario, the node can multiplex this broadcast session with other services from resource reservation point of view if the actual traffic is lower than requested as described elsewhere herein.

Figure 5A:
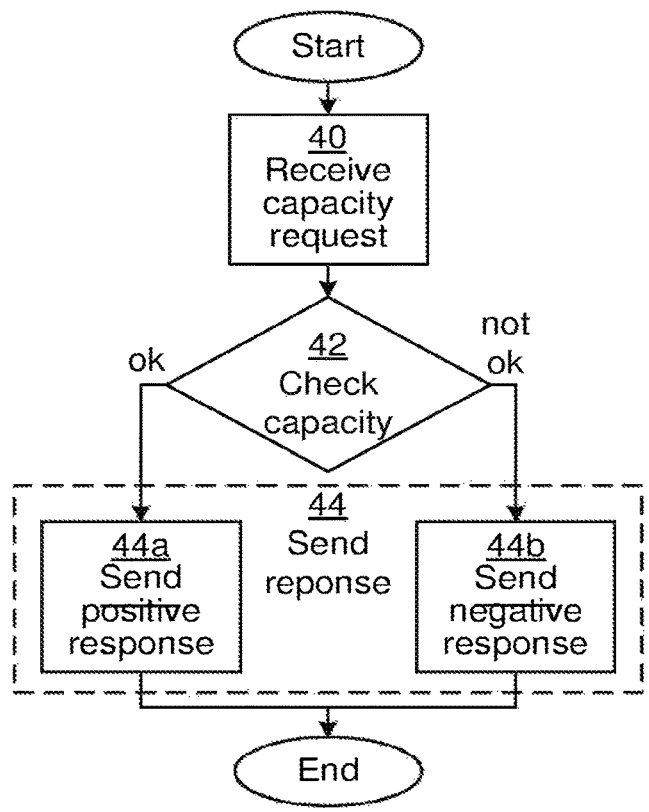
FIGS. 5A-B are flow charts illustrating methods for checking capacity for a multimedia session.
Figure 5B:
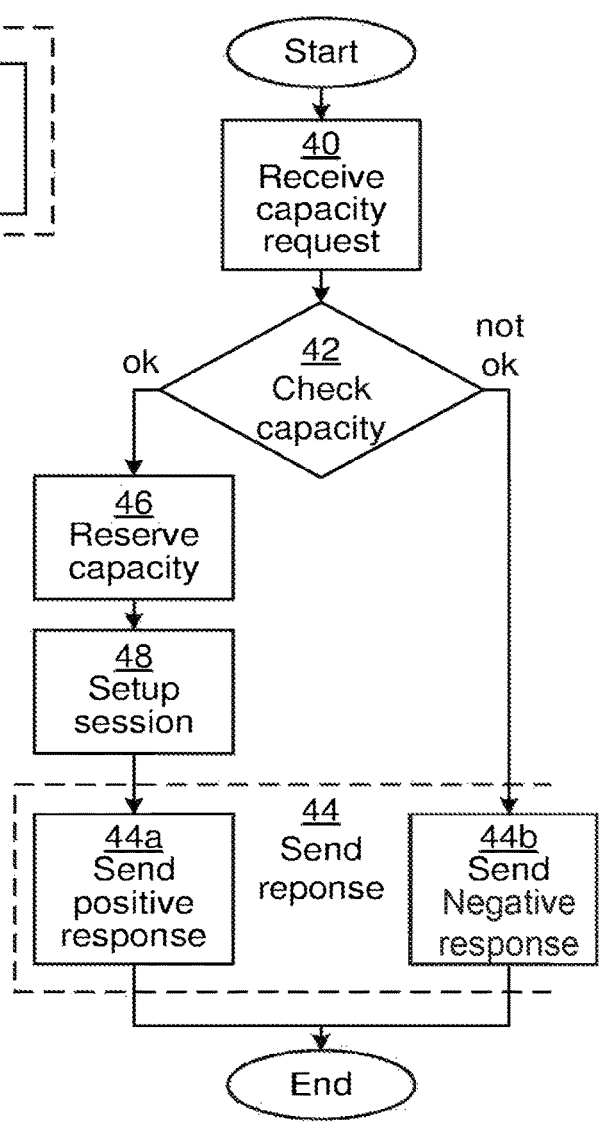

FIGS. 5A-B are flow charts illustrating methods for checking capacity for a multimedia session. The method is performed in a multimedia delivery service node, e.g. BMSC, of a multimedia network. The method can be applied in a SFN network.

In a receive capacity request step 40, a capacity request for a multimedia session is received, e.g. from a content provider. The capacity request comprises a desired bandwidth, a requested Quality of Service Class Identifier, QCI, a requested time window and a desired location in terms of at least one service area. As explained above, each service area is served by a plurality of radio base stations. The at least one service area are provided in the capacity request as a service area list (comprising one or more items).

In one embodiment, the capacity request further comprises a list of (at least one) cell identifiers which are a subset of all cell identifiers sets of the at least one service area. The list of cell identifiers provides more detail with regard to the desired location.

The capacity request can be in the form of a multimedia session setup request (e.g. an eMBMS setup request).

Optionally, a request for checking capacity is first received, after which a request for reserving capacity is received.

In a conditional check capacity step 42, the BMSC checks whether there is sufficient capacity in each service area for the desired bandwidth and desired QCI during the desired time window of the request. This is performed by reading available capacity in an aggregated capacity database. The aggregated capacity database comprises data indicating available bandwidth capacity on a service area level. Moreover, available radio capacity on a radio resource level is read in a resource capacity database.

In one embodiment, the resource capacity database stores available radio capacity per combination of service area list and QCI list.

In one embodiment, the resource capacity database stores available radio capacity per combination of cell id and QCI.

If there is sufficient capacity, the method proceeds to a send positive response substep 44*a* of a send response step 44. Otherwise, the method proceeds to as send negative response step 44*b* of the send response step 44.

Hence, in the send response step 44, a response is based on whether there is sufficient capacity or not. More specifically, in the send positive response step 44*a*, a positive response is sent and in the send negative response step 44*b*, a negative response is sent. Optionally, the negative response comprises an indication of available capacity to fulfil the capacity request. This allows the requester to evaluate whether to send a new request with a lower bandwidth value, within the available capacity.

Looking now to FIG. 5B, only new or modified steps compared to FIG. 5A will be described.

Here, if the conditional check capacity step 42 results in that sufficient capacity is determined, the method proceeds to an optional reserve capacity step 46.

In the optional reserve capacity step 46, capacity is reserved by updating the aggregated capacity database when there is sufficient capacity. When the capacity request comprises an indicator not to multiplex, this can comprise reserving capacity for the multimedia session of the capacity request without multiplexing the multimedia session with other multimedia sessions.

Optionally, this step comprises updating the resource database to reflect a new available bandwidth and radio resource usage as a result of the capacity request.

In an optional setup session step 48, the method proceeds with a multimedia session setup.

Release of reservations can be received and effected in an analogous way as shown in FIGS. 5A-B and described above. The capacity release request can be in the form of a multimedia session stop request. Optionally release of reservation proceeds with a multimedia session stop.

Optionally, APIs (Application Programming Interfaces) are provided by the BMSC to allow 3rd parties to create broadcast services. The APIs can include any one or more of the following APIs.

1. Check Available LTE Broadcast Resource API: This method could have input parameters such as list of service areas and an optional time window. Then available common resource on those service areas and at that time window will be returned, or if time window is not specified just return current common available resources on the list of service areas. This API corresponds to embodiments explained above with reference to FIG. 5A.

2. Reserve LTE Broadcast Resource API: This method could have input parameters such as list of service areas, QCI, bandwidth and time window. Depending on reservation result, corresponding response will be returned, if failed, warning with detailed information could be returned (such as on which service area resource is not sufficient). This API corresponds to embodiments explained above with reference to FIG. 5B, and in particular when step 46 is performed.

3. Release LTE Broadcast Resource API: This method could have input parameters such as list of service areas, QCI, bandwidth and time window. Depending on release result, corresponding response will be returned. This API performs the reverse action of the reserve capacity step 46.

4. Validate LTE Broadcast Resource API: This method could have input parameters such as list of service areas, QCI, bandwidth and time window. Depending on validation result with assumption on the indicated resource is updated, corresponding response will be sent. When there are conflicts, a warning with detailed information could be returned (such as for which service on which service area has conflict). When there are no conflicts, the resource will not be reserved but the operator is provided with information to decide whether to really deploy the configuration update or not. This API corresponds to embodiments explained above with reference to FIG. 5A.

An example of where an embodiment of the method is applied will now be described. It is to be noted that the table structure shown here is only an example and any other suitable data structure can be applied. This example is based on the example illustrated in Table 1 and Table 2 above.

In this example, a request is received (step 40) for a first service: Service 1: SAI:1, QCI:12; bandwidth: 1,000 KBPS, time window: 09:00-10:00 today. It is to be noted that for reasons of clarity, only times and not dates are included in this example. This results in a new entry in the aggregated capacity database 20.

TABLE 3

Example reservation in the aggregation capacity database 20

| SAI | QCI | startTime | stopTime | Used BW |
|-----|-----|-----------|----------|---------|
| 1   | 12  | 9:00      | 10:00    | 1000    |

Referring to the first line in Table 1, using SAI and QCI, remaining capacity can be calculated as 3,408−1,000=2,408. Also, the resource capacity database 21 is updated with the reservation as shown in Table 4. The used ratio is calculated as 1,000/3,408=30%.

TABLE 4

Example reservation in the resource capacity database 21

| Resource | UsedQCI | startTime | stopTime | usedRatio |
|----------|---------|-----------|----------|-----------|
| 2        | 12      | 9:00      | 10:00    | 30%       |

A request for a new service is then received in step 40 for service 2: SAI:1; QCI:13; bandwidth: 2,000 KBPS, time window:9:30-10:30). Note that this request is for a single particular QCI, compared with the QCI list of Table 2 which can contain several QCIs. The aggregated capacity database 20 is then updated with a new entry as shown in Table 5:

TABLE 5

Example reservation in the aggregated capacity database 20

| SAI | QCI | startTime | stopTime | usedBW |
|-----|-----|-----------|----------|--------|
| 1   | 12  | 9:00      | 10:00    | 1000   |
| 1   | 13  | 9:30      | 10:30    | 2000   |

Correspondingly, the resource capacity database is updated with an added entry for the reservation as shown in Table 6. The used radio is calculated as 2000/4579=44%.

TABLE 6

Example reservation in the resource capacity database 21

| Resource | UsedQCI | startTime | stopTime | usedRatio |
|----------|---------|-----------|----------|-----------|
| 2        | 12      | 9:00      | 10:00    | 30%       |
| 2        | 13      | 9:30      | 10:30    | 44%       |

Since both services use same resource (resource identifier=2), remaining resources is only 100%−30%−44%=26% during the overlapping time window 9:30-10:00. From service capacity point of view, during the overlapped time window, SAI:1 & QCI:12 can only support a bandwidth of 26%*3,408 KBPS (from Table 1)=886 KBPS, and SAI:1 & QCI:13 can support bandwidth of 26%*4,579 KBPS (from Table 1)=1,190 KBPS.

With SAI tree structure imported, the resource control for a broadcast session could decompose composite SAI into atom SAIs and only check the resource status on those atoms SAIs.

Once service is in operation, in service monitoring is employed to ensure end to end service quality. Real time monitoring can be performed by sampling a small percentage of the cells to get a near real time status overview in the whole MBSFN, which is modelled as one resource in the resource database.

Figure 6:
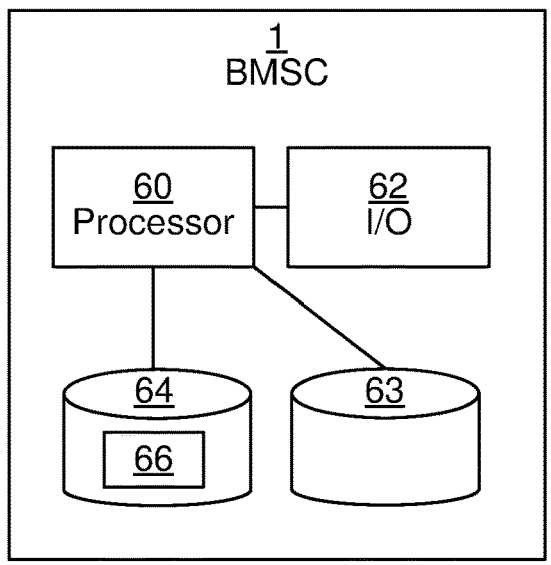
FIG. 6 is a schematic diagram showing some components of the BMSC of FIG. 1 according to one embodiment.

FIG. 6 is a schematic diagram showing some components of the BMSC of FIG. 1 according to one embodiment. A processor 60 is provided using any combination of one or more of a suitable central processing unit (CPU), multiprocessor, microcontroller, digital signal processor (DSP), application specific integrated circuit etc., capable of executing software instructions 66 stored in a memory 64. The memory can thus be considered to be a computer program product. The processor 60 can be configured to execute the method described with reference to FIGS. 5A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM) and may also comprise persistent storage, which, for example, can be any single one or combination of magnetic memory, optical memory, solid state memory or even remotely mounted memory. The data memory 63 can be distributed over several physical devices. The data memory comprises the aggregated capacity database (20 of FIG. 3) and the resource capacity database (21 of FIG. 3).

The BMSC 1 further comprises an I/O interface 62 for communicating with other external entities, e.g. using a wired galvanic and/or optical network connection for communication with the CDN 6, MBMS Gateway 7, etc. Optionally, the I/O interface 62 also includes a user interface, which can be used for a manual import of data from the RAN layer to the data memory 63.

Other components of the BMSC 1 are omitted in order not to obscure the concepts presented herein.

Figure 7:
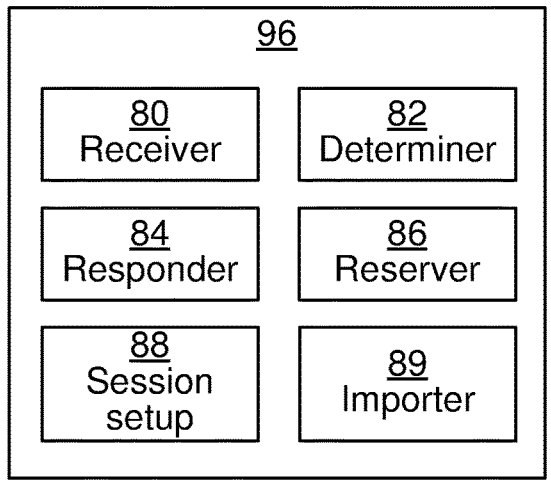
FIG. 7 is a schematic diagram showing some components of the BMSC of FIG. 1 according to one embodiment.

FIG. 7 is a schematic diagram showing a set 96 of modules of the BMSC of FIG. 1 according to one embodiment. The set 96 of modules are implemented using software instructions (e.g. the software instructions 66 of FIG. 6) such as a computer program executing in the BMSC. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A and 5B.

A receiver 80 is configured to receive a capacity request in correspondance with step 40. A determiner 82 is configured to check capacity in correspondance with step 42. A responder 84 is configured to send a response in correspondance with steps 44, 44*a* and 44*b*. A reserver 86 is configured to reserve capacity in correspondance with step 46. A session setup module 88 is configured to setup a session in correspondance with step 48. An importer 89 is configured to import information of the SAI tree structure to the service capacity layer, i.e. the aggregated capacity database.

Figure 8:
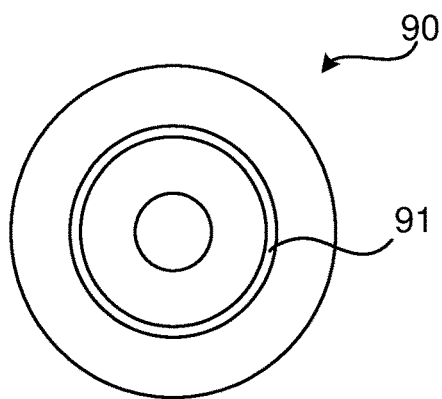
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for checking capacity for a multimedia session, the method comprising a multimedia delivery service node of a multimedia network:
    receiving, by the multimedia delivery service node, a capacity request for a multimedia session, the capacity request comprising a desired bandwidth, a requested Quality of Service Class Identifier (QCI), a requested time window, and a desired location in terms of at least one service area, each service area being served by a plurality of radio base stations;
    checking, by the multimedia delivery service node, whether there is sufficient capacity in each service area for the desired bandwidth and desired QCI during the desired time window of the request by:
        reading available capacity in an aggregated capacity database, the aggregated capacity database comprising available bandwidth capacity on a service area level; and
        reading available radio capacity on a radio resource level in a resource capacity database,
            wherein the resource capacity database stores available radio capacity per combination of QCI and any of service area list and cell id; and
    sending, by the multimedia delivery service node, a response based on whether there is sufficient capacity or not.

2. The method of claim 1, wherein the capacity request further comprises a list of cell identifiers which are a subset of all cell identifiers sets of the at least one service area, the list of cell identifiers providing more detail with regard to the desired location.

3. The method of claim 1, wherein the response comprises an indication of available capacity to fulfil the capacity request.

4. The method of claim 1, further comprising reserving capacity by updating the aggregated capacity database when there is sufficient capacity.

5. The method of claim 4, wherein the reserving capacity comprises reserving capacity for the multimedia session of the capacity request without multiplexing the multimedia session with other multimedia sessions when the capacity request comprises an indicator not to multiplex.

6. The method of claim 4, wherein the reserving capacity comprises updating the resource database to reflect a new available bandwidth and radio resource usage as a result of the capacity request.

7. The method of claim 1, wherein the capacity request is in the form of a multimedia session setup request.

8. The method of claim 7, further comprising proceeding with a multimedia session setup only when there is sufficient capacity.

9. A multimedia delivery service node for checking capacity for a multimedia session, the multimedia delivery service node being configured to form part of a multimedia network, the multimedia delivery service node comprising:
    processing circuitry;
    memory containing instructions executable by the processing circuitry whereby the multimedia delivery service node is operative to:
    receive a capacity request for a multimedia session, the capacity request comprising a desired bandwidth, a requested Quality of Service Class Identifier (QCI), a requested time window, and a desired location in terms of at least one service area, each service area being served by a plurality of radio base stations;
    check whether there is sufficient capacity in each service area for the desired bandwidth and desired QCI during the desired time window of the request by:
        reading available capacity in an aggregated capacity database, the aggregated capacity database comprising available bandwidth capacity on a service area level; and
        reading available radio capacity on a radio resource level in a resource capacity database,
            wherein the resource capacity database stores available radio capacity per combination of QCI and any of service area list and cell id; and
    send a response based on whether there is sufficient capacity or not.

10. The multimedia delivery service node of claim 9, wherein the capacity request further comprises a list of cell identifiers which are a subset of all cell identifiers sets of the at least one service area, the list of cell identifiers providing more detail with regard to the desired location.

11. The multimedia delivery service node of claim 9, wherein the response comprises an indication of available capacity to fulfil the capacity request.

12. The multimedia delivery service node of claim 9, wherein the instructions are such that the multimedia delivery service node is operative to reserve capacity by updating the aggregated capacity database when there is sufficient capacity.

13. The multimedia delivery service node of claim 12, wherein the instructions are such that the multimedia delivery service node is operative to reserve capacity for the multimedia session of the capacity request without multiplexing the multimedia session with other multimedia sessions when the capacity request comprises an indicator not to multiplex.

14. The multimedia delivery service node of claim 12, wherein the instructions are such that the multimedia delivery service node is operative to update the resource database to reflect a new available bandwidth and radio resource usage as a result of the capacity request.

15. The multimedia delivery service node of claim 9, wherein the capacity request is in the form of a multimedia session setup request.

16. The multimedia delivery service node of claim 15, wherein the instructions are such that the multimedia delivery service node is operative to proceed with a multimedia session setup only when there is sufficient capacity.

17. A non-transitory computer readable recording medium storing a computer program product for checking capacity for a multimedia session, the computer program product comprising software instructions which, when run on processing circuitry of a multimedia delivery service node of a multimedia network, causes the a multimedia delivery service node to:
  receive a capacity request for a multimedia session, the capacity request comprising a desired bandwidth, a requested Quality of Service Class Identifier (QCI), a requested time window, and a desired location in terms of at least one service area, each service area being served by a plurality of radio base stations;
  check whether there is sufficient capacity in each service area for the desired bandwidth and desired QCI during the desired time window of the request by:
    reading available capacity in an aggregated capacity database), the aggregated capacity database comprising available bandwidth capacity on a service area level,
      wherein the resource capacity database stores available radio capacity per combination of QCI and any of service area list and cell id; and
    reading available radio capacity on a radio resource level in a resource capacity database; and
  send a response based on whether there is sufficient capacity or not.

\* \* \* \* \*